(12) United States Patent  (10) Patent No.: US 8,036,507 B2
Watanabe  (45) Date of Patent: Oct. 11, 2011

(54) OPTICAL WAVEGUIDE DEVICE AND MANUFACTURING METHOD THEREOF

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 12/501,066

(22) Filed: Jul. 10, 2009

(65) Prior Publication Data

US 2010/0008622 A1    Jan. 14, 2010

(30) Foreign Application Priority Data

Jul. 11, 2008 (JP) .................................. 2008-181867

(51) Int. Cl.
G02B 6/26 (2006.01)
(52) U.S. Cl. ................................ 385/52; 385/49; 385/92
(58) Field of Classification Search ................... 349/52, 349/49, 88, 89, 92, 94
See application file for complete search history.

(56) References Cited

U.S. PATENT DOCUMENTS

2010/0183266 A1 * 7/2010 Shimoda et al. ................. 385/88

FOREIGN PATENT DOCUMENTS

JP        63-5310 A    1/1988
JP        8-334655 A   12/1996

* cited by examiner

*Primary Examiner* — Brian M. Healy
*Assistant Examiner* — Mary El-Shamma

(57) ABSTRACT

An optical waveguide device includes: a substrate; an optical element arranged on the substrate; and an optical circuit part having an optical waveguide formed on the substrate. The optical circuit part includes: a core whose optical axis is matched with the optical element; and a dummy core arranged on a same layer to the core and exposed on a side being not opposed to the optical element when the optical element is arranged on the substrate. The relative position between the optical waveguide and the optical element can be recognized by observing the dummy core. The planar shape of the optical circuit has a convex portion. The width of the convex portion and the width of the optical element are same in the opposing edge face where the optical element and the core is opposed to one another.

6 Claims, 7 Drawing Sheets

OPTICAL WAVEGUIDE DEVICE AND MANUFACTURING METHOD THEREOF

INCORPORATION BY REFERENCE

This application is related to Japanese Patent Application No. 2008-181867 filed at 11 Jul. 2008. The disclosure of that application is incorporated herein by reference.

TECHNICAL FIELD

The present invention relates to an optical waveguide device and a manufacturing method thereof.

BACKGROUND ART

In an optical access market, optical transceivers are used. As an optical transceiver, the micro-optics type module and the PLC (Planar Lightwave Circuit) module are known. The micro-optics type module includes an LD (Laser Diode), a PD (Photodiode), a thin film filter, a lens, and the like. The PLC module is configured by fabricating a quartz waveguide on a silicon substrate, and surface-mounting an LD, PD and the like. Both of them have advantages and disadvantages; however, the PLC module is advantageous in cost and delivery because it is not required to perform the optical axis adjustment while monitoring the optical output.

As a mounting method for such a PLC module, the passive alignment mounting is known. In the passive alignment mounting, alignment of a waveguide chip in the planar direction is performed by image-recognizing alignment markers with infrared light. Alignment in the vertical direction is performed with a block called the pedestal. The pedestal is fabricated with high accuracy. By putting an optical part on the pedestal, the height of the optical part and the height of an optical waveguide can be aligned with high accuracy.

FIG. 1 is a birds-eye view illustrating a reference example of the passive alignment mounting. FIG. 2A is a plan view and FIG. 2B is a side view. In this reference example, a semiconductor laser chip (LD chip) is presumed as an optical element. An optical circuit part 120 is formed on a silicon substrate 101. The optical circuit part 120 is formed with a core 105 functioning as an optical waveguide.

The optical circuit part 120 can be formed by a following method: on the silicon substrate 101, a lower clad layer 102 is formed. On the lower clad layer 102, a core layer serving as a source of the core 105 is formed. On the core layer, a photoresist having a pattern of the core 105 is formed by the photolithography technique. An unmasked portion is removed by the RIE (Reactive Ion Etching), and thereby the core 105 is formed. Subsequently, a reflow glass layer 103 (or a buried layer) is formed. On the reflow glass layer 103, an upper clad layer 104 is formed to thereby complete the optical circuit part 120.

Examples of a cross-sectional configuration of the optical circuit part 120 formed by such a process are illustrated in FIGS. 3 and 4. If the thickness of the film removed by the RIE is small, an unnecessary core layer 105a remains in addition to an optical waveguide region as illustrated in FIG. 4. In such a configuration, optical waveguide characteristics are largely deteriorated, and therefore it is not preferable that the unnecessary core layer 105a remains.

In order to surely remove the unnecessary core layer 105a, the lower clad layer 102 is typically also etched to some portion thereof in the core layer etching step because it is impossible to selectively etch only the core layer by the RIE. FIG. 3 illustrates a cross-sectional structure of the optical circuit part 120 formed in this manner. In this example, a lower surface of the core 105 is higher than the boundary face between the lower clad layer 102 and the reflow glass layer 103 in a region other than the core 105. FIG. 1 illustrates such a stacked structure.

In order to mount the LD chip 109, a silica film in a predetermined region on the silicon substrate 101 is removed. On the silicon substrate 101 in that region, pedestals 106, an electrode 107, and alignment markers 108 are formed. The pedestals 106 are designed such that when the LD chip 109 is placed on the pedestals 106, the height of an active layer 110 of the LD chip 109 and the height of the core 105 of the optical circuit part 120 coincide with each other. The electrode 107 is formed to make an electrical connection to a connecting terminal of the LD chip 109. By aligning the alignment markers 108 with alignment markers 115 on an LD chip 109 side, and fixing the LD chip 109 to the pedestals 6, an optical axis in the planar direction can be aligned.

The followings are reference techniques regarding the connection between an optical waveguide formed on a substrate and an optical element: Japanese Laid-Open Patent Application JP-A-Showa, 63-5310; and Japanese Laid-Open Patent Application JP-A-Heisei, 8-334655.

SUMMARY

However, the alignment based on such a method has a following problem: The PLC module having a pedestal structure should typically be fabricated with high accuracy such that the height of the active layer of the LD and the height of the core of the optical waveguide coincide with each other after LD mounting. The heights of the both are almost determined on the basis of the accuracy of a deposition apparatus such as the CVD apparatus. A variation in the film thickness within a wafer surface caused by a common CVD is approximately 3%. Assuming that the height of a pedestal is 5 μm, and the thickness of a lower clad layer is 10 μm, the height misalignment of up to under 0.5 μm may arise. If the both are highly efficiently coupled, an increase in coupling loss caused by the height misalignment of 0.5 μm is not negligible.

As described, upon fabrication of a PLC module, the film thickness should be controlled with very high accuracy. On the other hand, it is difficult to check whether the completed module is as designed, or the design is correct. In order to perform such a check, design verification is performed typically by experimental techniques. For example, pedestals having different heights are respectively formed on a plurality of wafers. The design verification is performed by mounting LDs on the respective pedestals, and comparing optical characteristics such as optical outputs of respective completed units with one another.

However, these verification methods include variations due to the following factors, and therefore obtained results do not always represent the adequacy of design:

(1) Optical circuits formed on a substrate include some sort of functions. For this reason, values indicating optical characteristics such as the optical output obtained as a result of intervention of the optical circuits are influenced by variations in characteristics of the optical circuits (such as the insertion loss, PDL (Polarization Dependent Loss), and branching ratio).

(2) An LD is not always mounted as expected. The LD may not be in contact with pedestals, or may incline.

(3) Misalignment influencing optical characteristics cannot be separated into planar directional misalignment and vertical directional misalignment.

That is, these mean that the achieved accuracy is low relative to required time and effort. Accordingly, in practice, a method in which an actual mounted state is checked with an electron microscope, and height misalignment is individually checked from the mounted state is most accurate and effective.

However, in a state where an optical element is mounted, for example, in the case where an observation is made from an observation direction 111 in FIG. 1, a side face as illustrated in FIG. 2B will be observed. In this state, an edge face of the LD and that of the optical circuit formed on the substrate face to each other with being in proximity to each other, and therefore the active layer of the LD and the core of the optical circuit on the substrate side cannot be visually checked. For this reason, the position of an optical axis cannot be directly visually recognized.

In such a case, the position of an optical axis of an LD can be recognized with use of a design value, for example, in a following manner: The depth of an active layer of an LD from an epitaxy growth front can be adjusted with very high accuracy. For this reason, if a side face of the LD is observed with an electron microscope, the position of the active layer can be almost accurately recognized. On the other hand, it is difficult to check the position of the core 105 of the optical circuit on the substrate side. The thickness of the lower clad layer 101 of the optical circuit formed on the substrate is as very thick as approximately 15 μm, and has large variation according to a typical relative refractive index difference. For this reason, the position of the core 105 in the height direction cannot be accurately determined only on the basis of the position of the silicon substrate 101.

Also, even if the boundary face of the lower clad layer 102 is observed with an electron microscope, the height of the core 105 cannot be specified for the following reason: As already described with reference to FIG. 3, in the RIE step for forming the core 105, the lower clad layer 102 is typically also removed to some portion thereof by the etching, and therefore the boundary face of the lower clad layer 102 and the height of the core 105 do not coincide with each other. Further, the amount of the etching varies within the wafer surface. Returning here to the previous description, in the case where the PLC module mounted with the LD chip 109 is observed with the electron microscope to check the height of the core 105, the coupling part will be observed from the observation direction 111 of FIG. 1 to observe the side face as illustrated in FIG. 2B. However, the boundary face of the lower clad layer 102 observed in the optical circuit on the substrate side corresponds to an etching front by the RIE, which has a large variation, and therefore the height directional position of the core 105 cannot be specified.

Therefore, an object of the present invention is to recognize the accurate height of an optical circuit formed on a substrate for matching an optical axis of the optical circuit and an optical element to be aligned.

According to an aspect of the present invention, an optical waveguide device includes: a substrate; an optical element arranged on the substrate; and an optical circuit part having an optical waveguide formed on the substrate. The optical circuit part includes: a core whose optical axis is matched with the optical element; and a dummy core arranged on a same layer to the core and exposed on a side being not opposed to the optical element when the optical element is arranged on the substrate.

Preferably, a planar shape of the optical circuit has a convex portion protruding on a side of the optical element at an opposing edge face where an edge face of the optical element and an edge face of the core is opposed to one another. The dummy core exposes on a side face of the convex portion different from the opposing edge face. A width of the convex portion and a width of the optical element are same in the opposing edge face.

According to an aspect of the present invention, a manufacturing method of an optical waveguide device includes: forming a lower clad layer on a substrate; forming a core layer on the lower clad layer; forming a core in a first region which forms a part of an optical waveguide and forming a dummy core in a second region which is different from the first region by etching the core layer wherein the first region and the second region are remained without being etched; manufacturing the optical waveguide by forming an upper clad layer on the core layer; arranging an optical element by aligning the optical element in accordance with an alignment mark formed on the substrate; and recognizing a positional relationship between the optical waveguide and the optical device by observing the dummy core exposed to an outside.

According to another aspect of the present invention, the manufacturing method of the optical waveguide device further includes: arranging a reflow glass layer between the core layer and the upper clad layer.

According to a present invention, it is possible to grasp the height of a core of an optical circuit on a substrate side, and to accurately recognize the relative position between the optical element and the optical axis of the optical circuit on the substrate side.

BRIEF DESCRIPTION OF THE DRAWINGS

The above and other objects, advantages and features of the present invention will be more apparent from the following description of certain preferred exemplary embodiments taken in conjunction with the accompanying drawings, in which.

EXEMPLARY EMBODIMENTS

Hereinafter, exemplary embodiments of the present invention will be described below with reference to the attached drawings.

Figure 5:
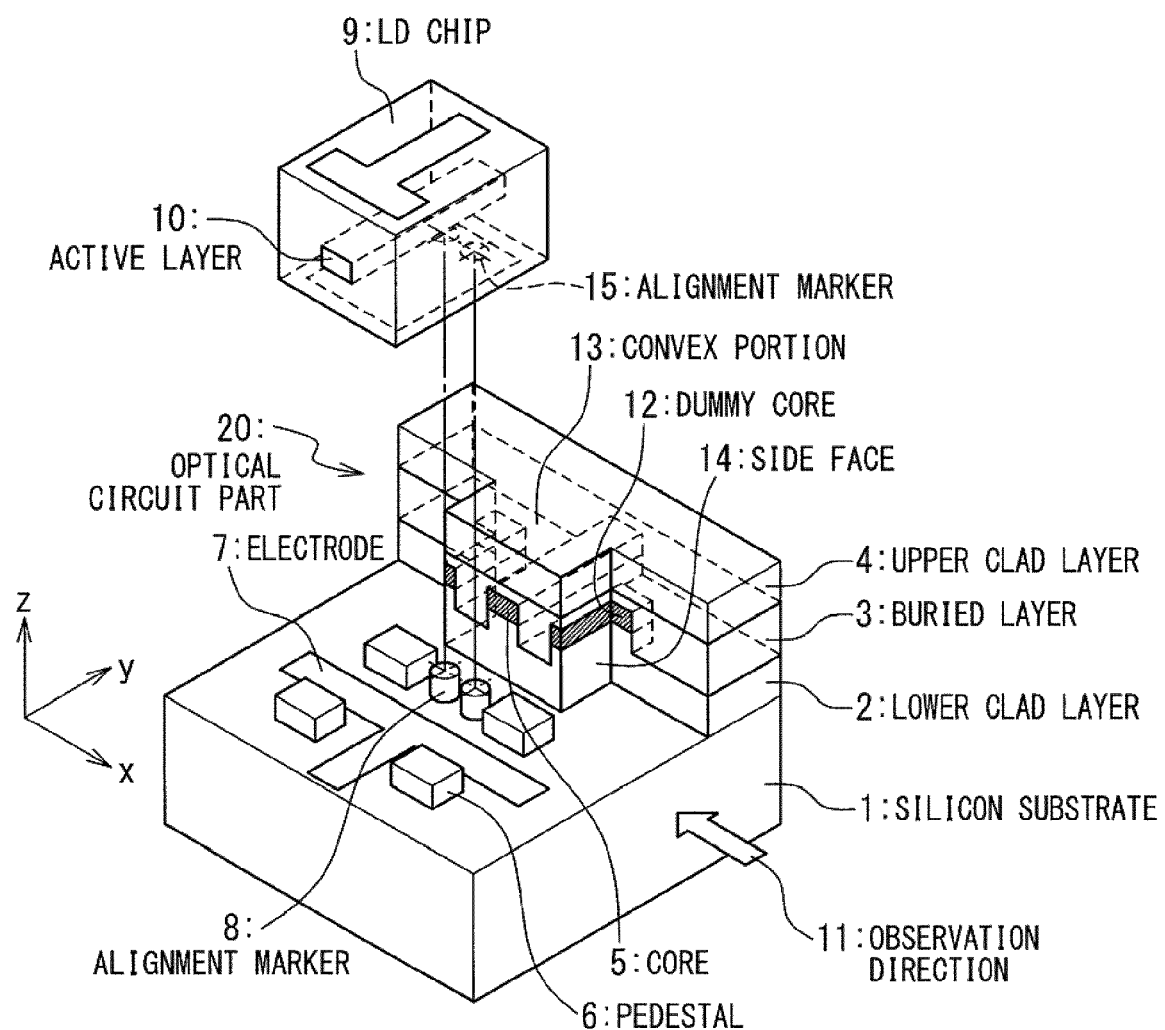
FIG. 5 illustrates a birds-eye view before an LD chip is mounted.
Figure 6:
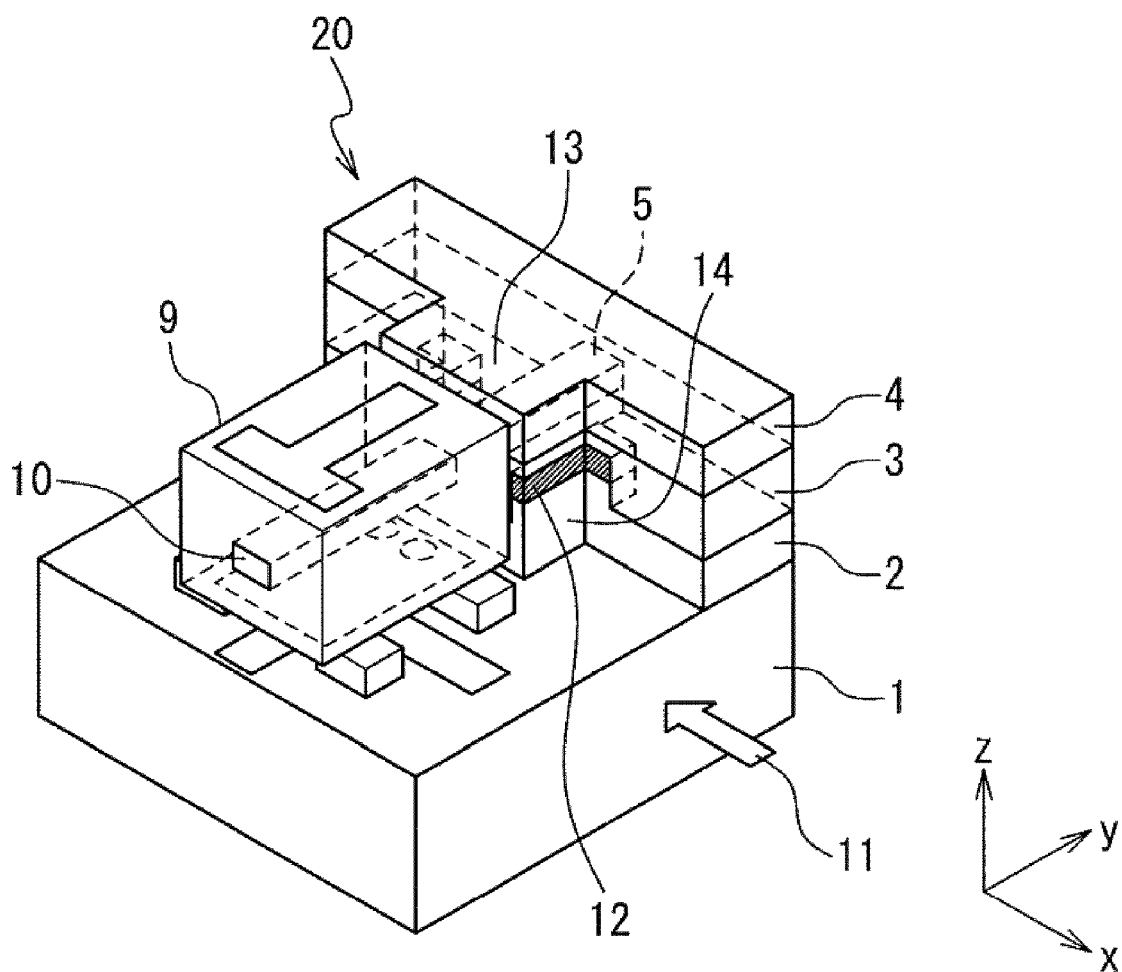
FIG. 6 illustrates a birds-eye view after the LD chip has been mounted.
Figure 7A:
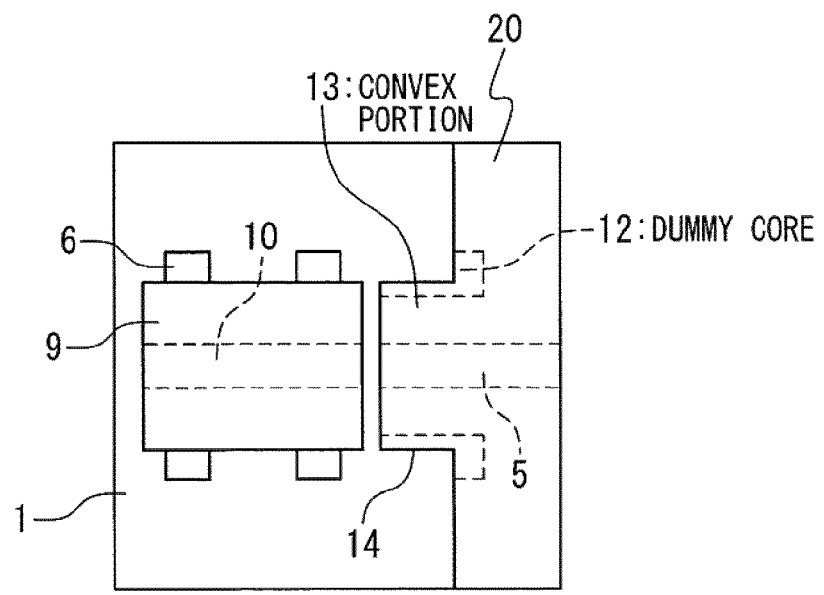
FIG. 7A illustrates a plan view after the LD chip is mounted.
Figure 7B:
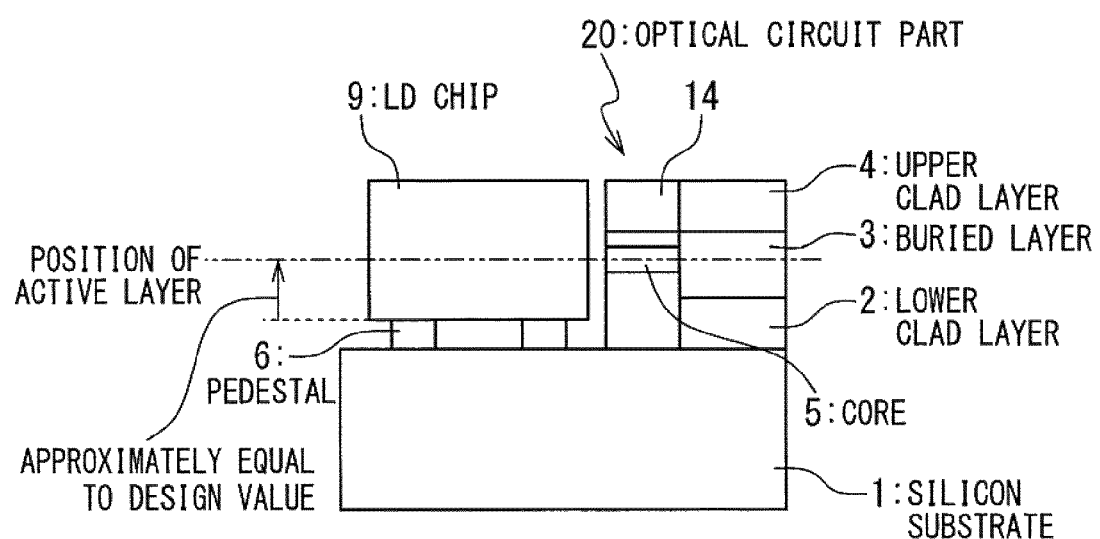
FIG. 7B illustrates a side view after the LD chip is mounted.

FIG. 5 is a birds-eye view before an LD chip 9 is mounted, FIG. 6 is a birds-eye view after the LD chip 9 is mounted, and FIGS. 7A and 7B are a plan view and a side view after the LD chip 9 is mounted, respectively.

In a present exemplary embodiment, as an example of an optical element, a semiconductor laser chip (LD chip) is presumed; however, even for the other optical elements, the following description makes sense in the same way. On a silicon substrate 1, an optical circuit part 20 (substrate side optical circuit part) is formed. The optical circuit part 20 is formed with a core 5 functioning as an optical axis of an optical waveguide (planar light waveguide circuit).

The optical circuit part 20 can be formed by the following method: On the silicon substrate 1, a lower clad layer 2 is formed. On the lower clad layer 2, a core layer serving as a source of the core 5 is formed. In first region and second region on the core layer, portions of photoresist having planar shape patterns of the core 5 and a dummy core 12 are respectively formed by a photolithography technique. The core 5 is a region functioning as an optical waveguide formed on the substrate side, and drawn as a simple linear waveguide for convenience; however, in practice, it is an optical circuit variously laid out so as to have various functions. The dummy core 12 is a mark for visually aligning in the height direction, and arranged in a position at which it is exposed on a side face 14 different from the edge face facing to the LD chip 9 (which is referred to as an opposing edge face). The core 5 formed on the first region and the dummy core 12 formed on the second region are preferably separated from each other; however, they may be connected to each other if its influence on characteristics of the optical circuit is small.

Figure 1:
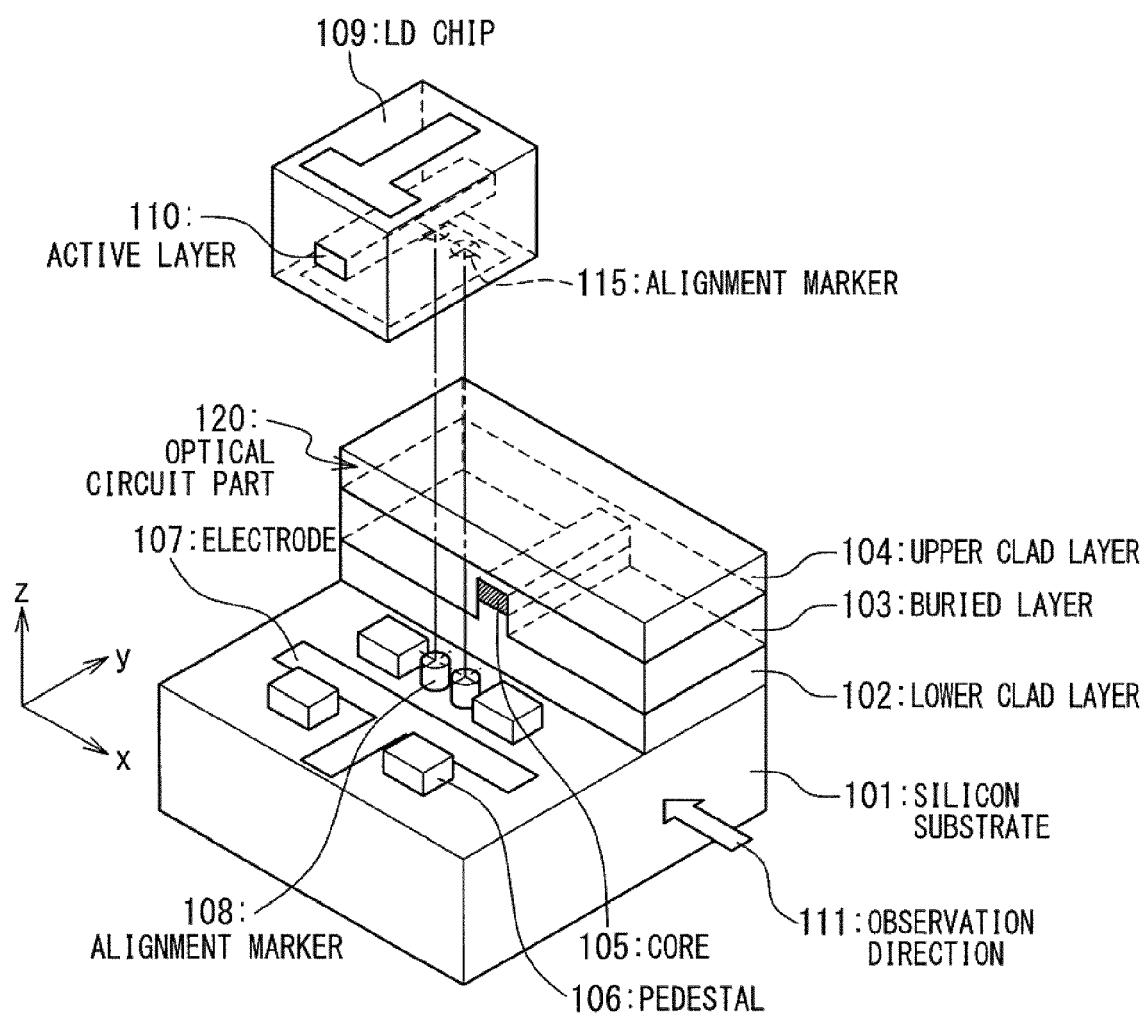
FIG. 1 is a birds-eye view illustrating a reference example of passive alignment mounting.
Figure 2A:
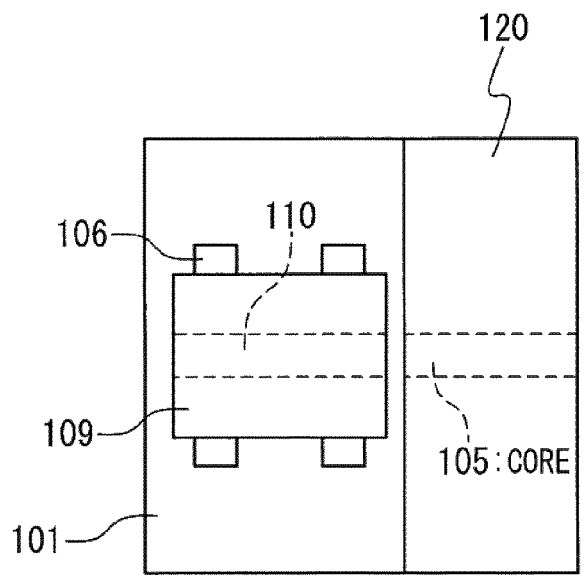
FIG. 2A is a plan view illustrating the reference example of the passive alignment mounting.
Figure 2B:
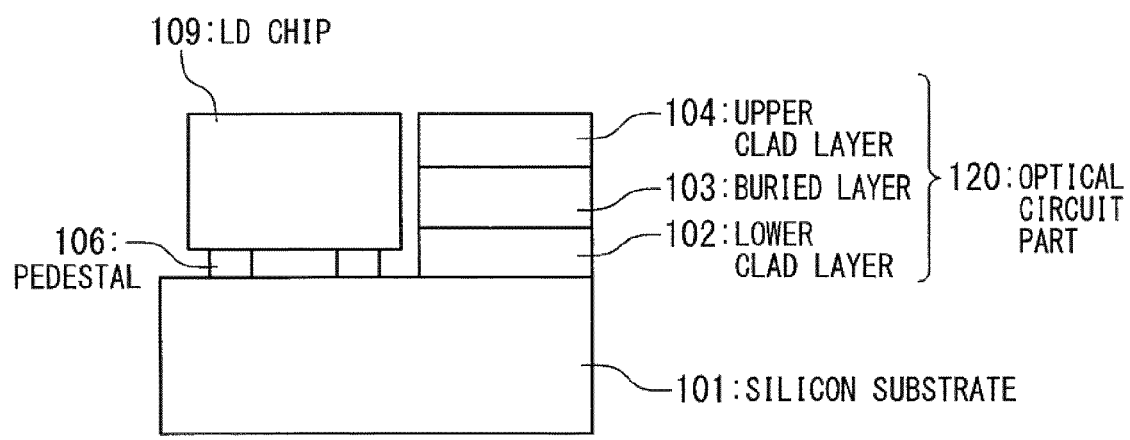
FIG. 2B is a side view illustrating the reference example of the passive alignment mounting.
Figure 3:
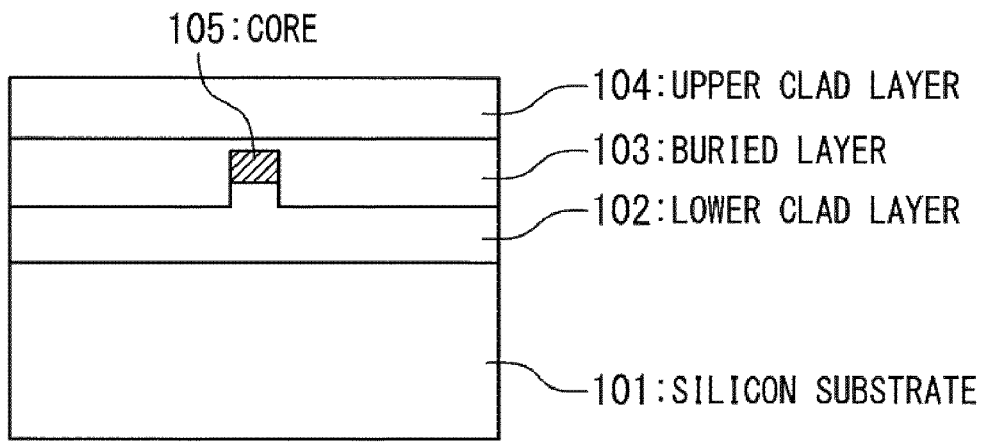
FIG. 3 illustrates a cross-sectional configuration of a PLC module.
Figure 4:
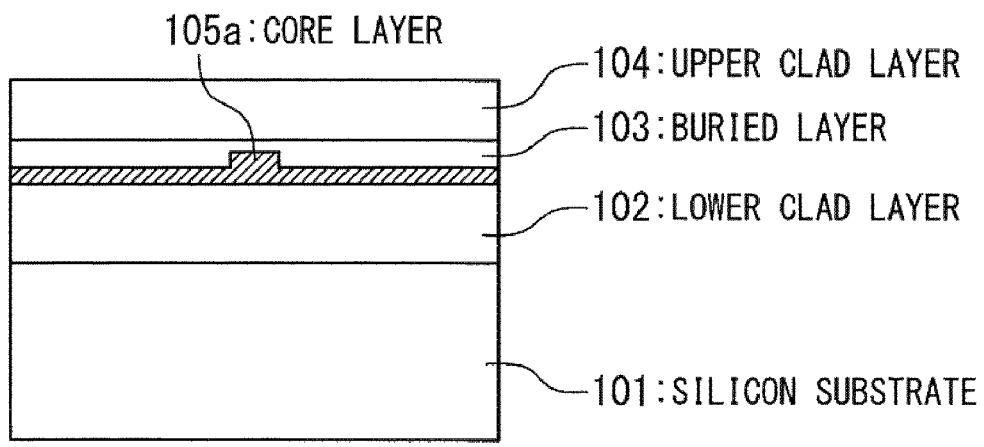
FIG. 4 illustrates a cross-sectional configuration of a PLC module.
Figure 8:
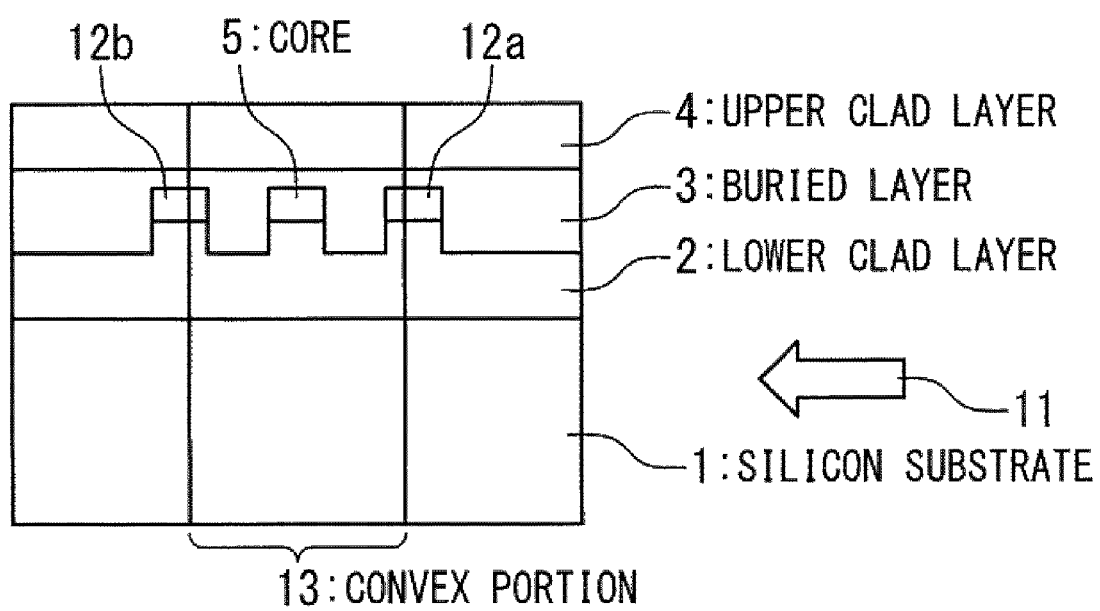
FIG. 8 illustrates a cross-sectional configuration of a PLC module having a dummy core.

A portion unmasked by the photoresist is removed by the RIE, and thereby the core 5 and the dummy core 12 are formed. At this time, the lower clad layer 102 is also etched to some portion thereof for the reason described referring to FIGS. 3 and 4. As a result, the lower clad layer and the core having cross-sectional shapes as illustrated in FIG. 8 (cross-sectional view as viewed from −y axial direction in FIG. 5) are obtained. Subsequently, a reflow glass layer 3 is formed. An upper surface of the reflow glass layer 3 is planarized, and on the planarized upper surface, an upper clad layer 4 is formed to complete a stacked structure constituting the optical circuit part 20.

On the upper clad layer 4, photoresist having a predetermined shape is formed, and the lower clad layer 2 to the upper clad layer 4 under the portion unmasked by the photoresist are removed by etching, and thereby the optical circuit part 20 is formed. A planar shape of the optical circuit part 20 has a convex portion 13 protruding on the LD chip 9 side. On an edge face of the convex portion 13 oppositely facing to the LD chip 9 (the edge face of the convex portion 13 parallel to the z-x plane in FIG. 5), an edge of the core 5 for making an optical connection to the LD chip 9 is exposed. On a side face of the convex portion 13 vertical to the edge face (edge face parallel to the y-z plane), an edge of the dummy core 12 is exposed. The dummy core 12 is formed in the same layer to the core 5 by a same process, and therefore arranged with having the same height and same film thickness as those of the core 5. The width (size in the x axial direction) of the convex portion 13 is preferably the same as that (size in the x axial direction) of the LD chip 9.

In a region on the silicon substrate 1, in which the silica film is removed, pedestals 6, an electrode 7, and alignment markers 8 are formed. The pedestals 6 are designed such that when the LD chip 9 is placed on the pedestals 6, the height of the active layer 10 of the LD chip 9 and the height of the core 5 of the optical circuit part 20 coincide with each other. The electrode 7 is formed to make an electrical connection to a connecting terminal of the LD chip 9.

The alignment markers 8 are formed to align the LD chip 9 in the direction parallel to the substrate surface. Each of the alignment markers is of a cylindrical shape having a central axis vertical to the substrate surface, and the upper surface thereof is covered with a metal film. The center position of the circular upper surface is adjusted with high accuracy on the basis of the position of the core 5. On the other hand, on a surface of an epi-side (side on which an epi-layer is formed) of the LD chip 9, alignment markers 15 each of which is a metal pattern serving as a circular template are also formed. The center positions of the respective alignment markers 15 are adjusted with high accuracy on the basis of the position of the active layer 10.

Upon mounting of the LD chip 9, the LD chip 9 is arranged on the pedestals 6 with epi-side down. The alignment markers 8 and the alignment markers 15 are overlaid, and then infrared light is irradiated from the back surface side of the silicon substrate 1 to observe transmitted light of the infrared light with a CCD from above the LD chip 9. The infrared light is shielded only by a metal portion, and therefore a marker image reflecting a positional relationship in the planar direction (direction parallel to the principal surface of the substrate) between the LD chip 9 and the silicon substrate 1 can be obtained. The positions of the alignment markers 8 on the substrate side, and the positions of the alignment markers 15 on an LD side are determined with high accuracy on the basis of the position of the core 5 and that of the active layer 10, respectively. For this reason, by placing the LD chip 9 on the pedestals 6 with optical centers of the both coinciding with each other, the optical axis can be aligned in the planar direction.

When the LD chip 9 is aligned with use of the alignment markers 8 and 15 and placed on the pedestals 6, a facing face that is a side face of the LD chip 9 facing to the edge face of the optical waveguide on the substrate side, and a facing face that is the side face of the convex portion 13 of the optical circuit part 20 on an LD chip 9 side face to each other with being in proximity to each other. In this state, an edge of the active layer 10 and an edge of the core 5 face to each other with being adjusted in position in the planar direction with high accuracy.

An observer uses an electron microscope to observe a side face of the PLC module from an observation direction 11. As already described, and also as illustrated in FIG. 7B, the height of the active layer 10 of the LD chip 9 can be recognized with high accuracy on the basis of design values by observing an appearance. On the other hand, by observing the dummy core 12 exposed on the side face of the convex portion 13 facing to the observation direction 11, the height of the core 5 can be accurately known. As a result, the accuracy of the adjustment in the height direction between the active layer 10 and the core 5 and the misalignment amount between them can be known. In particular, as illustrated in FIG. 8, even in the case where the lower clad layer 2 is intentionally removed to some portion thereof to prevent the core layer from remaining upon formation of the core 5 by a lithography technique, the height of the core 5 can be accurately known.

A side face vertical to a facing face of the LD chip 9 (a side face facing to the observation direction 11), and a side face vertical to a facing face of the convex portion 13 (the side face facing to the observation direction 11) are preferably arranged in a same plane. Such an arrangement enables the side face of the LD chip 9 and the side face of the convex portion 13 (in particular, a dummy core 12a illustrated in FIG. 8) to be observed with a same focus. Further, in this case, if the width of the LD chip 9 and the width of the convex portion 13 are the same, and the dummy core 12 is formed symmetrically to the core 5, side faces of the LD chip 9 and convex portion 13 on the side opposite to the observation direction 11 are arranged in a same plane. In such a case, in the case where an observation is made from the other observation direction on a side opposite to the one observation direction 11, the side faces of the LD chip 9 and the dummy core 12 (a dummy core 12b illustrated in FIG. 8) facing to the other observation direction can also be observed with a same focus.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. An optical waveguide device comprising:
    a substrate;
    an optical element arranged on the substrate; and
    an optical circuit part having an optical waveguide formed on the substrate,
    wherein the optical circuit part includes:
    a core whose optical axis is matched with the optical element; and
    a dummy core arranged on a same layer to the core and exposed on a side being not opposed to the optical element when the optical element is arranged on the substrate,
    wherein a planar shape of the optical circuit has a convex portion protruding on a side of the optical element at an opposing edge face where an edge face of the optical element and an edge face of the core is opposed to one another,
    the dummy core exposes on a side face of the convex portion different from the opposing edge face, and
    a width of the convex portion and a width of the optical element are same in the opposing edge face.

2. The optical waveguide device according to claim 1, wherein the optical circuit part includes:
    a lower clad layer arranged on the substrate;
    the core arranged in a first region on the lower clad layer;
    the dummy core arranged on a second region on the lower clad layer and being separated from the first region; and
    an upper clad layer arranged in an upper side of the lower clad layer.

3. The optical waveguide device according to claim 2, further comprising:
    a reflow glass layer arranged between the lower clad layer and the upper clad layer to cover the core and the dummy core.

4. The optical waveguide device according to claim 2, wherein the reflow glass layer is configured to function as an upper clad layer which forms an optical waveguide with the core and the lower clad layer.

5. The optical waveguide device according to claim 2, wherein a boundary face between the lower clad layer and the reflow glass layer is lower than a boundary face of the lower clad layer and the core in a height from the substrate.

6. The optical waveguide device according to claim 1, wherein the side face is arranged on a same surface to an side face of the optical element.

* * * * *